E. F. PRICE.
TRANSMISSION GEARING.
APPLICATION FILED FEB. 2, 1911.

1,013,565.

Patented Jan. 2, 1912.
2 SHEETS—SHEET 1.

Witnesses
G. Howard Walmsley.
Edward R. Reed.

Inventor
Edwin F. Price,
By H. A. Toulmin,
Attorney

E. F. PRICE.
TRANSMISSION GEARING.
APPLICATION FILED FEB. 2, 1911.

1,013,565.

Patented Jan. 2, 1912.
2 SHEETS—SHEET 2.

Witnesses

Inventor
Edwin F. Price,
By
Attorney

UNITED STATES PATENT OFFICE.

EDWIN F. PRICE, OF UPPER SANDUSKY, OHIO, ASSIGNOR TO THE OHIO MANUFACTURING COMPANY, OF UPPER SANDUSKY, OHIO, A CORPORATION OF OHIO.

TRANSMISSION-GEARING.

1,013,565.  Specification of Letters Patent.  Patented Jan. 2, 1912.

Application filed February 2, 1911. Serial No. 606,110.

*To all whom it may concern:*

Be it known that I, EDWIN F. PRICE, a citizen of the United States, residing at Upper Sandusky, in the county of Wyandot and State of Ohio, have invented certain new and useful Improvements in Transmission-Gearing, of which the following is a specification, reference being had therein to the accompanying drawings.

This invention relates to transmission gearing and, although capable of general use, is designed more particularly for use with gasolene traction engines.

The object of the invention is to provide a transmission gearing of a very compact arrangement and of such a character that the slidable gear can be readily intermeshed with the driven gear; and further, to provide such a gearing having two neutral points so that the slidable gears can be disengaged from the driven gears and, when clutched to the engine shaft, will move in unison therewith, thereby eliminating the wear on the gears and their coöperating parts and also materially reducing the noise of operation.

Figure 1:
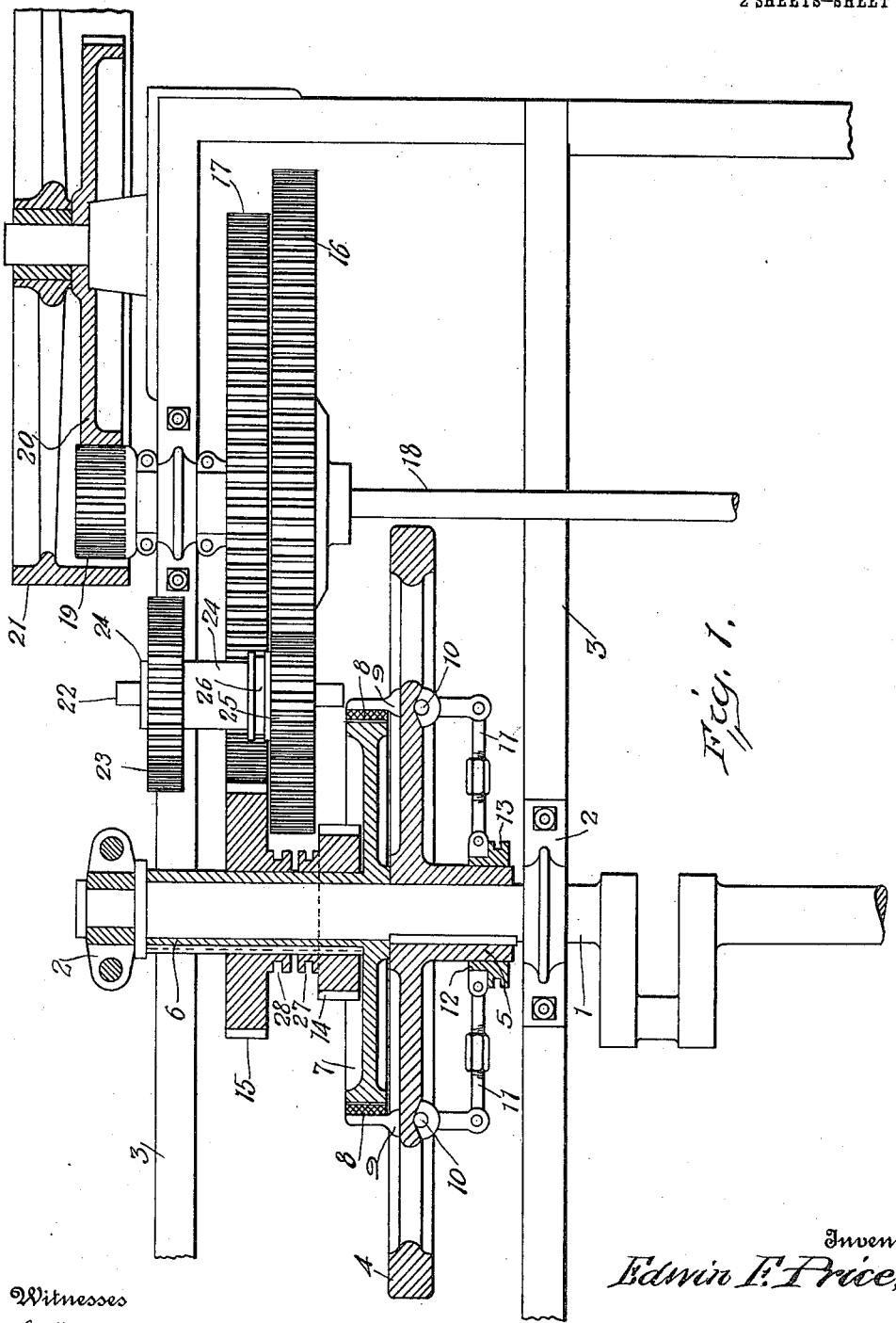
Figure 2:
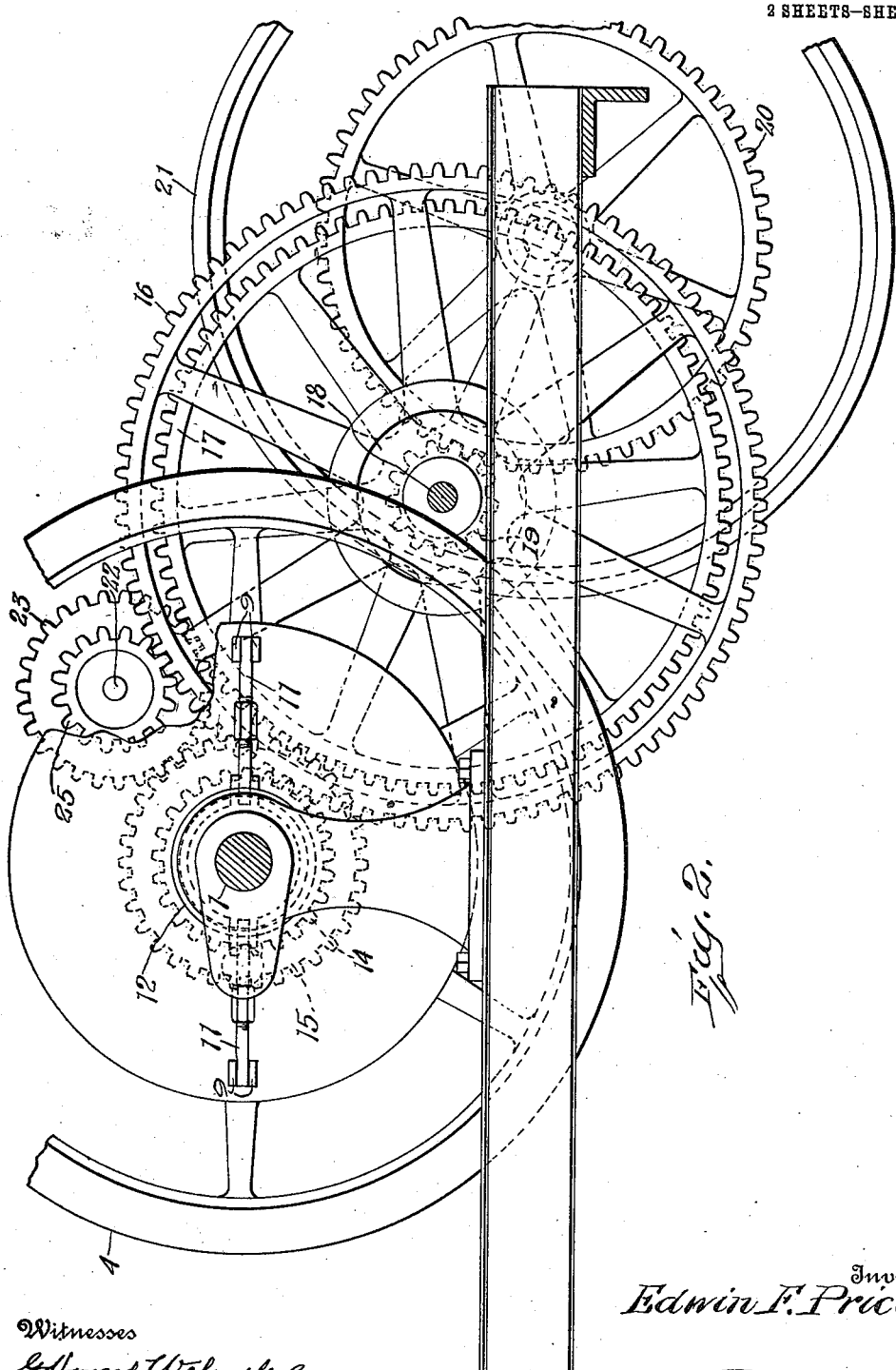

In the accompanying drawings, Figure 1 is a top, plan view, partly in section, of a portion of a gasolene traction engine equipped with my invention; and Fig. 2 is a side elevation of the mechanism shown in Fig. 1.

In these drawings I have illustrated one embodiment of my invention and have shown the same as comprising a driving shaft 1 which is preferably the engine shaft and is journaled in suitable bearings 2 on the frame 3 of the traction engine. Rigidly secured to the shaft 1 is a fly wheel 4 having an elongated hub 5. A sleeve 6 is loosely mounted on the shaft 1 beyond the fly wheel 4 and has secured thereto and preferably formed integral therewith a friction drum 7 which is arranged close to the fly wheel and forms one member of a clutch mechanism by means of which the sleeve is connected with the shaft. This clutch mechanism comprises in addition to the drum 7 a series of friction shoes 8 spaced at intervals about the surface of the drum 7 and carried by arms or levers 9 extending transversely to the fly wheel and pivotally mounted thereon, as indicated at 10. The inner ends of the arms 9, that is, the ends opposite the ends carrying the shoes 8, are connected by links 11 with a collar 12 slidably mounted upon the elongated hub 5 and having an annular groove 13 adapted to receive the arms of a yoke, which, in turn, is connected with a lever for shifting the collar. This yoke and its actuating lever are of a well known character and it is not necessary to illustrate or describe the same.

Slidably mounted upon the sleeve 6 and held against rotation relatively thereto are two gears 14 and 15, of different diameters, which constitute the driving gears and which are adapted to mesh with two driven gears 16 and 17, respectively. These latter gears are of different diameters and are carried by a driven shaft 18 which, in the present instance, is a countershaft having at its opposite ends pinions 19 meshing with gears 20 carried by traction wheels 21. In the present instance I have illustrated but one pinion and traction wheel, but it will be understood that the pinion 19 at the other end of the countershaft and its coöperating traction wheel are identical with that here shown. A second countershaft 22 is supported upon the main frame and carries a pinion 23, which, in turn, is mounted on an elongated hub or sleeve 24 rigidly secured to the shaft 22. The pinion 23 is arranged in a vertical plane some distance from the vertical planes of the gears 16 and 17 and the pinion is arranged in such a position that the larger driving gear 15 will mesh therewith when this gear has been moved into its outermost position. Slidably mounted upon the sleeve 24 and held against rotation relatively thereto is a second pinion 25, the hub of which is provided with an annular groove, as shown at 26, to receive the arms of a shifting yoke, which may be of any suitable construction. This second pinion 25 may be moved into and out of mesh with the larger of the driven gears, 16, by shifting the same along the sleeve 24. When the driving gear 15 is in mesh with the pinion 23 and the pinion 25 is in mesh with the driven gear 16 the traction wheels and the machine as a whole will be driven in a reverse direction. The distance between the planes of the pinion 23 and the adjacent driven gear, 17, is such that the driving gear 15 can be moved into a position on its supporting sleeve in which it will be out of mesh with both the pinion 23 and the driven gear 17. Likewise, the space between the driven gear 16 and the friction drum 7 is such that the driving gear 14 can be moved into a position, in which it will be out of mesh with its driven gear. The two driving gears are movable longitudinally of the sleeve independently of each other and the hub of each is provided with a grooved collar, 27 and 28, respectively, to receive the arms of a shifting yoke, of ordinary construction. It will be apparent, therefore, that there are two neutral positions and that each driving gear may be moved into an idle or neutral position. When the driving gears are in these neutral positions the sleeve 6 which carries the same may be clutched to the driving shaft and the sleeve and the parts carried thereby will rotate in unison with the driving shaft without engaging or in anywise affecting the driven gears or reversing pinions, thereby eliminating all wear and all noise which may result when these parts are in operative relation, and further, eliminating all friction and wear between the sleeve 6 and the shaft 1. When the driving gears are in their neutral positions and the sleeve is disconnected from the driving shaft frictional contact between the shaft and the sleeve, which is quite heavy, will be such as to cause the sleeve and the gears carried thereby to rotate with the shaft when this is in operation. Consequently, the position of the driving gears relative to the driven gears is constantly changing and it is thus possible to intermesh these gears at any time.

By arranging the friction drum or clutch member 3 close to the fly wheel and mounting the coöperating clutch devices on the fly wheel itself with the shifting collar on the side of the fly wheel opposite the friction drum I provide a very compact arrangement, and, at the same time, have sufficient space between the friction drum and the driving gears to provide a neutral position for one of the driving gears.

I wish it to be understood that I do not desire to be limited to the details of construction shown and described, for obvious modifications will occur to a person skilled in the art.

Having thus fully described my invention, what I claim as new and desire to secure by Letters Patent, is:—

1. The combination, with a driving shaft and a driven shaft, of a fly wheel mounted on said driving shaft, a clutch member loosely mounted on said driving shaft, coöperating clutch members carried by said fly wheel, a shifting device for said last-mentioned clutch members, a driven gear mounted on said driven shaft, a driving gear operatively connected with said first-mentioned clutch member, movable toward and away from the same and having a neutral position between said first-mentioned clutch member and said driven gear.

2. The combination, with a driving shaft and a driven shaft, of a fly wheel rigidly secured to said driving shaft, a sleeve rotatably mounted on said driving shaft, a clutch member rigidly secured to said sleeve adjacent to said fly wheel, coöperating clutch members carried by said fly wheel and adapted to engage said first-mentioned clutch member, a shifting device for said last-mentioned clutch members, a driven gear mounted on said driven shaft and spaced away from said first-mentioned clutch member, and a driving gear slidably mounted on said sleeve, held against rotation relatively thereto and adapted to be moved into mesh with said driven gear or into a neutral position between said driven gear and said friction drum.

3. The combination, with a driving shaft and a driven shaft, of a fly wheel rigidly secured to said driving shaft, a sleeve rotatably mounted on said driving shaft, a clutch member rigidly secured to said sleeve adjacent to said fly wheel, coöperating clutch members on said fly wheel, two driven gears of different diameters carried by said driven shaft, two driving gears of different diameters slidably mounted on said sleeve and held against rotation relatively thereto, the smaller of said driving gears being adapted to be moved into mesh with the larger of said driven gears or into a neutral position between the larger of said driven gears and said friction drum, and the larger of said driving gears being adapted to be moved into mesh with the smaller of said driven gears or into a neutral position on the outer side of said driven gear.

4. The combination, with a driving shaft and a driven shaft, of a sleeve loosely mounted on said driving shaft, means for connecting and disconnecting said sleeve with said driving shaft, two driven gears carried by said driven shaft, two driving gears slidably mounted on said sleeve, held against rotation relatively thereto and adapted to be moved into and out of mesh with the respective driven gears, a countershaft supported adjacent to said driving shaft, a sleeve mounted on said countershaft, a pinion secured to said sleeve and adapted to be engaged by one of said driving gears when the latter is moved to its outermost position, a second pinion slidably mounted on the last-mentioned sleeve, held against rotation relatively thereto and adapted to be moved into and out of mesh with one of said driven gears, said driven gears being spaced away from said clutch member and the first-mentioned pinion being spaced away from said driven gears, whereby one of said driving gears may be moved into a neutral position between its driven gear and its clutch member and the other of said driving gears may be moved into a neutral position between its driven gear and said first-mentioned pinion.

5. The combination, with a driving shaft and a driven shaft, of a sleeve loosely mounted on said driving shaft, means for connecting and disconnecting said sleeve with said driving shaft, two driven gears carried by said driven shaft, two driving gears slidably mounted on said sleeve, held against rotation relatively thereto and adapted to be moved into and out of mesh with the respective driven gears, a countershaft supported adjacent to said driving shaft, and two pinions mounted on said countershaft, one of which is adapted to engage one of said driven gears and the other of which is adapted to be engaged by one of said driving gears.

In testimony whereof, I affix my signature in presence of two witnesses.

EDWIN F. PRICE.

Witnesses:
 D. C. PARKER,
 I. H. CARTER.

Copies of this patent may be obtained for five cents each, by addressing the "Commissioner of Patents, Washington, D. C."